April 14, 1970   E. W. YETTER   3,506,811
PROCESS CONTROL APPARATUS

Filed March 1, 1966   5 Sheets-Sheet 1

INVENTOR
EDWARD W. YETTER

BY Harry J. McCauley

ATTORNEY

April 14, 1970     E. W. YETTER     3,506,811
PROCESS CONTROL APPARATUS
Filed March 1, 1966     5 Sheets-Sheet 2

INVENTOR
EDWARD W. YETTER

BY *Harry J. McCauley*

ATTORNEY

April 14, 1970 E. W. YETTER 3,506,811
PROCESS CONTROL APPARATUS
Filed March 1, 1966 5 Sheets-Sheet 4

INVENTOR
EDWARD W. YETTER

BY Harry J. M$^c$Cauley

ATTORNEY

INVENTOR
EDWARD W. YETTER

BY Harry J. McCauley

ATTORNEY

United States Patent Office 3,506,811
Patented Apr. 14, 1970

3,506,811
PROCESS CONTROL APPARATUS
Edward W. Yetter, West Chester, Pa., assignor to E. I. du Pont de Nemours and Company, Wilmington, Del., a corporation of Delaware
Filed Mar. 1, 1966, Ser. No. 530,842
Int. Cl. G06f 15/46; G06j 1/00
U.S. Cl. 235—151.1                         13 Claims

ABSTRACT OF THE DISCLOSURE

A process controller adapted to service an individual process loop, or a relatively small number of individual process loops collectively, incorporating a null-balancing comparator opposing a process signal which is a function of the process to be controlled with a counterbalancing signal generated responsive to the sensed unbalance between the two signals, and concurrently generating a proportionate control effectuation signal applied to apparatus operating on the process.

---

This invention relates to a process control apparatus, and particularly to a direct digital control apparatus adapted to service individual process loops, or a relatively small number of individual process loops collectively, on either an independent or multiplexed basis.

Hitherto it has been the practice to share one or more components of automatic process control equipment for the service of all or substantial numbers of the multiple loops of processes which it was desired to control automatically. Recently great progress has been achieved in the design of monolithic solid state circuits, giving promise of substantial future cost reductions in components applicable to control technology, and this makes economically feasible the provision of analog-to-digital (A to D) converters, as well as counters, for each individual loop or for relatively small numbers of loops collectively. This invention contemplates a direct digital individual loop controller which can be fabricated utilizing solid state components throughout and possesses great advantages as a consequence of individual service allocation, or at least limited shared employment, as opposed to full-scale shared allocation within the complete control assembly. Among these advantages are freedom from drift as compared with analog controllers, enhanced ease of coupling with a central computer, if this is desired, freedom from limitations imposed as a function of loop number, freedom from the deleterious consequences of breakdown of a central computer and the ability to use a relatively wide variety of computers for accomplishment of centralized control.

Figure 1:
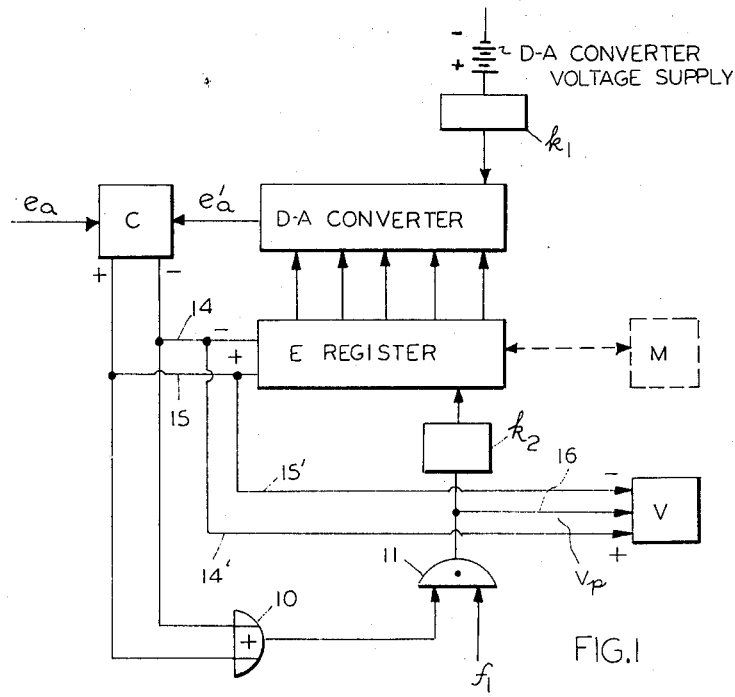
Figure 2:
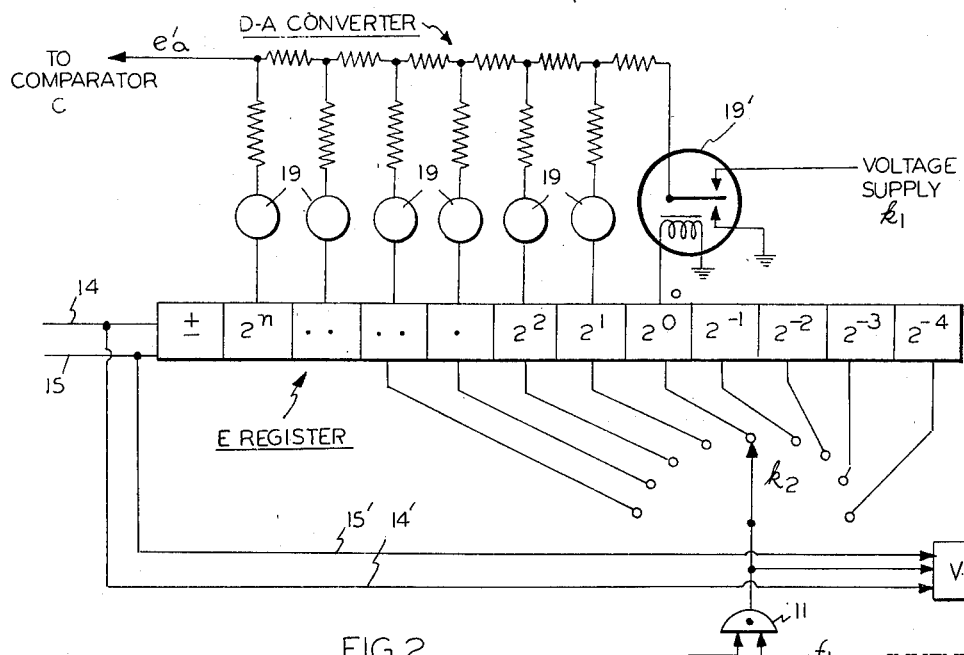
Figure 4:
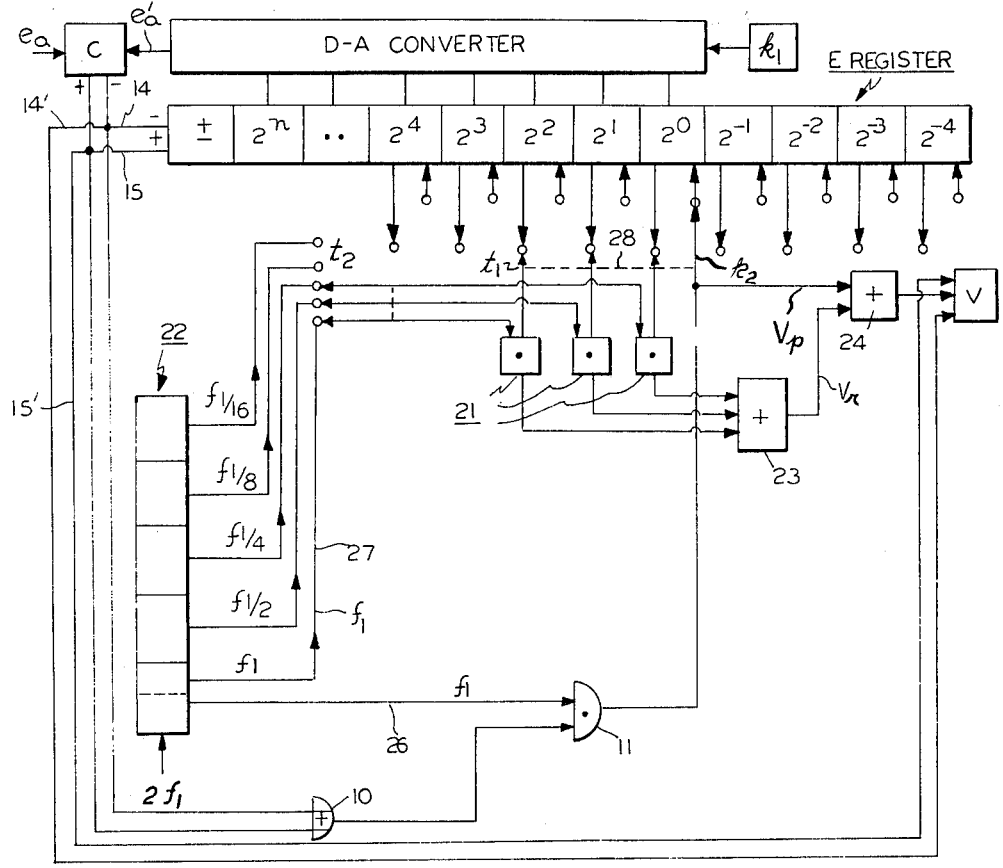
Figure 3:
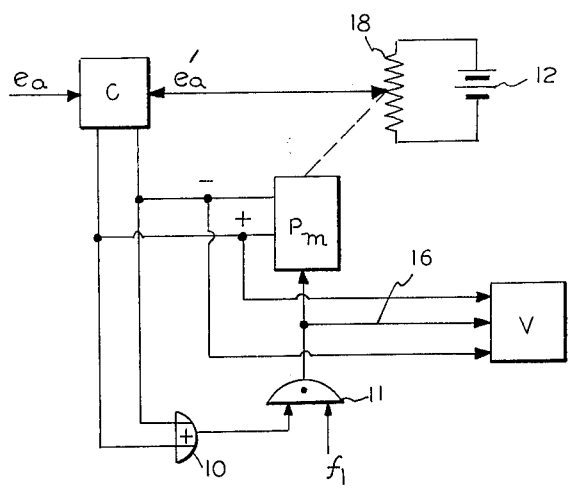
Figure 5:
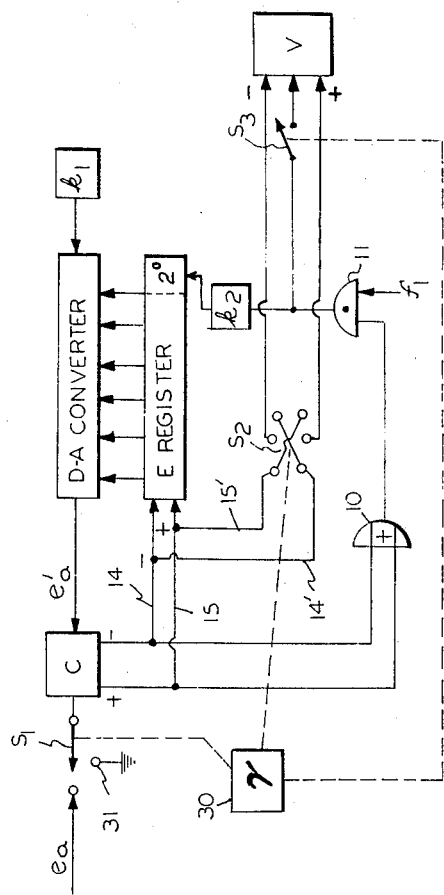
Figure 6:
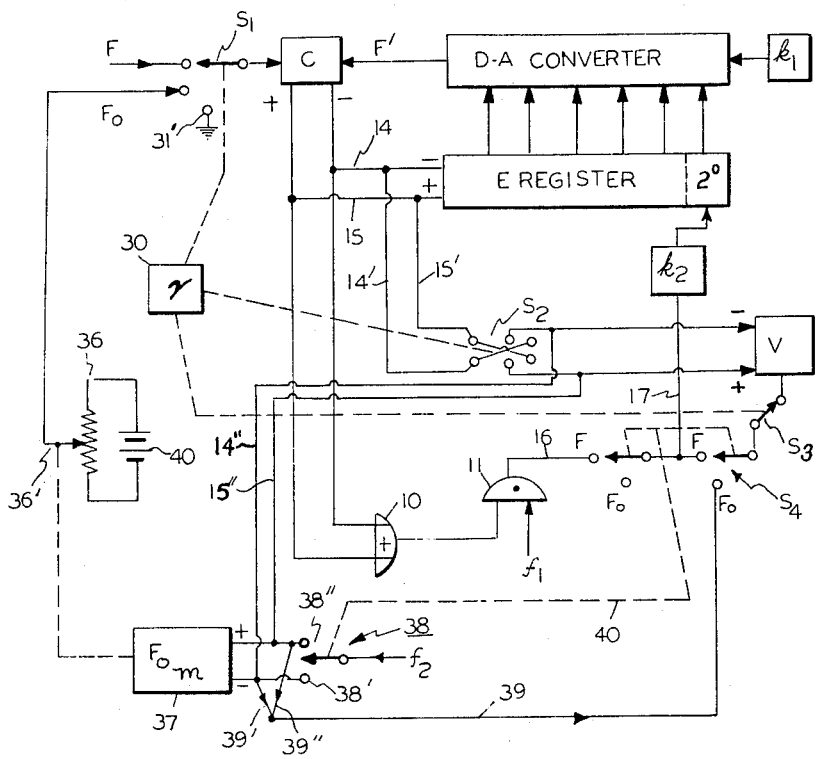
Figure 7:
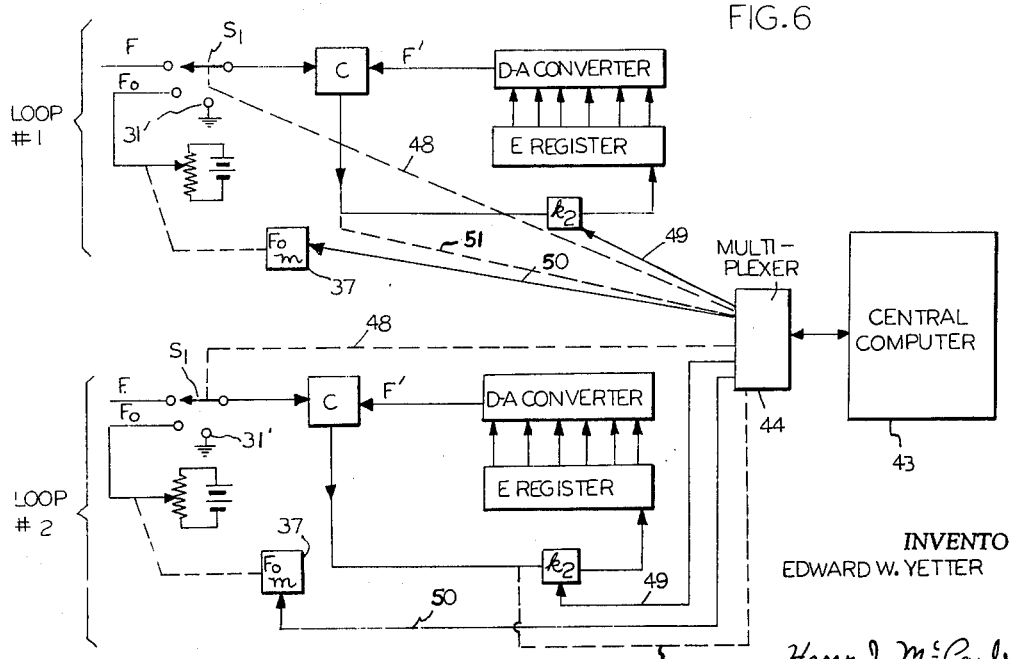
Figure 8A:
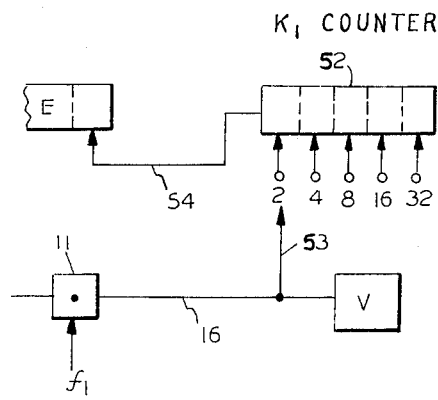
Figure 8B:
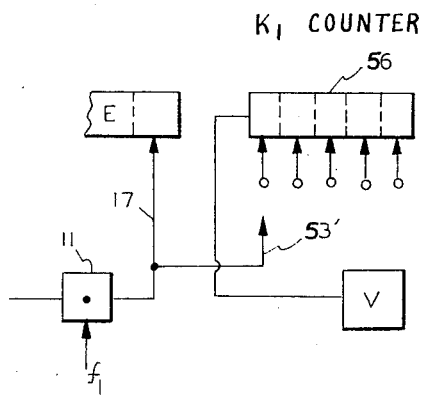
Figure 9:
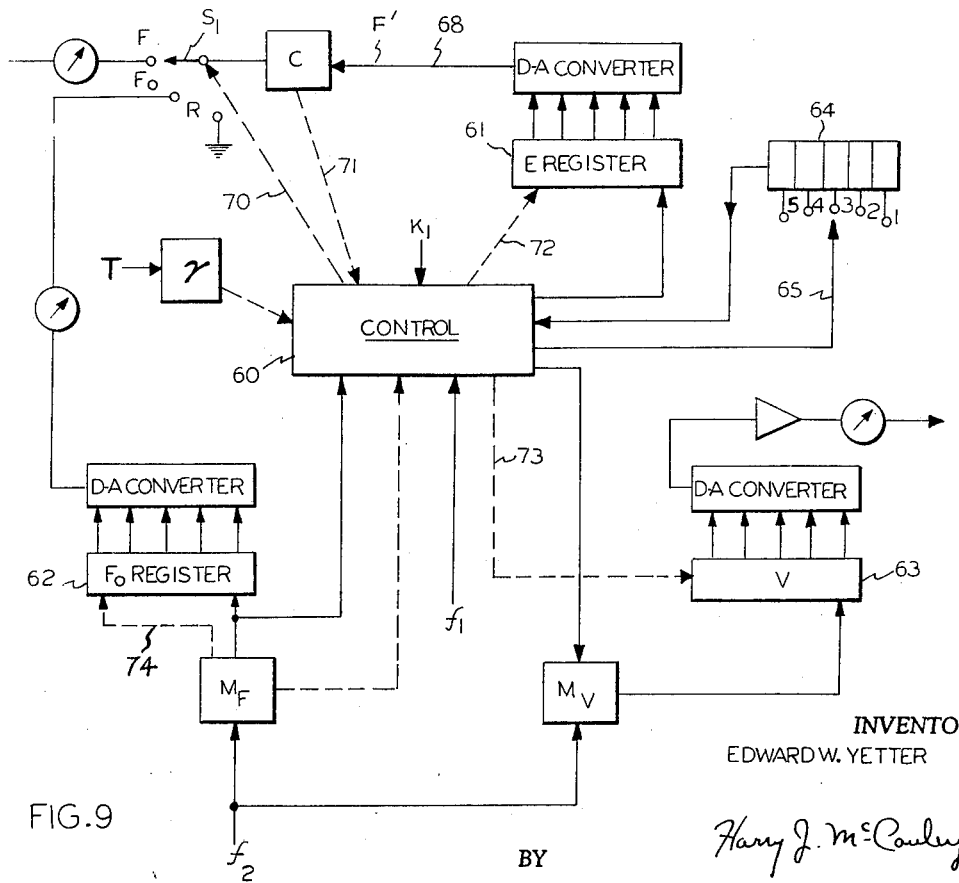

An object of this invention is, accordingly, to provide an improved digital apparatus adapted to the control of a process via individual or small multiple loop control effectuation. Other objects of this invention are to provide a relatively low cost process controller of a design insensitive to central control agency failure and free of limitations arising out of large scale multiple loop sharing. The manner in which these and other objects of this invention are attained will become obvious from the detailed description hereinafter set forth taken together with the drawings, in which:

FIG. 1 is a schematic diagram illustrative of the general principle of this invention as regards the generation of a counterbalancing feedback signal concurrently with a process control signal responsive to a sensed process signal, FIG. 2 is a schematic representation of the E (accumulator) register of FIG. 1 shown with its associated signal inputs and outputs, FIG. 3 is a block diagram illustrating an alternate method of achieving the operation of FIG. 1 wherein a pulse motor-driven potentiometer is substituted for the counter D-A converter combination of FIG. 1, FIG. 4 is a schematic representation of ancillary equipment capable of conferring a preselected velocity pattern type of reset action to the E register of FIG. 2, FIG. 5 is a schematic diagram of the apparatus of FIG. 1 modified to achieve reset control incrementally, FIG. 6 is a schematic diagram of the apparatus of FIGS. 1 and 5, adapted to accomplish reset control on the basis of the measured variable F and set point $F_0$ directly, without necessity for prior signal conversion to analog, FIG. 7 is a schematic representation illustrating information transfer solely for two individual loop controllers according to this invention in multiplexed arrangement, and optionally, with yet other loop controllers, via a central computer, FIG. 8 shows schematically how a $K_1$ (proportional) constant counter is connected to a pulse-actuated control agency V to, in FIG. 8a, effect operation of V at a rate greater than the error $e$, i.e., $K_1 > 1$, whereas FIG. 8b shows schematically how a $K_1$ (proportional) constant counter is connected to a pulse-actuated control agency V to effect operation of V at a rate less than the error $e$, i.e., $K_1 < 1$, and FIG. 9 is a schematic diagram of a preferred embodiment of control apparatus for accomplishing proportional plus reset process control according to this invention.

Generally, this invention consists of a process controller adapted to service either an individual process loop, or a relatively small number of individual process loops collectively comprising, in combination, means delivering a process signal which is a function of a process condition to be controlled, a null-balancing comparator receiving as one input the process signal and, in opposition therewith, a counterbalancing feedback signal, and means connecting the unbalance signal output from said comparator to gating means in series circuit between an electrical pulse source and pulse-actuated means generating, as functions of the unbalance signal output; (1) said counterbalancing feedback signal and (2) a control effectuation signal applied to apparatus operating on said process in a sense adjusting the process signal to a predetermined value.

While not limited to the effectuation of the conventional proportional plus reset type of process control, this invention is espectially capable of control effectuation according to this mode and is therefore hereinafter described in application to this type of control.

The proportional + reset control alogrithm, in continuous form, is:

(1)
$$V = K_1 \Delta F + \frac{K_1}{T} \int_0^t \Delta dt$$

where

V = the position of the final operator,
$\Delta F$ = deviation of the controlled variable from the set point, i.e., the error signal, $e_a$,
$K_1$ = a proportional constant, and
T = the reset constant.

In digital expression, Equation 1 can be written:
(2a) In position form:

$$V_n = K_1 \Delta F_n + \frac{\Delta t K_1}{T} \sum^n \Delta F_n$$

where $\Delta t$ = the sample interval and
$n$ = the number of the current (i.e., latest) sample.

(2b) In velocity form:

$$\frac{dV}{dt}n = \frac{K_1}{\Delta t}(\Delta F_n - \Delta F_{n-1}) + \frac{K_1}{T}\Delta F$$

and (2c) In incremental position form:

$$\Delta V = V_n - V_{n-1}$$

where $V_n$ = present position and
$V_{n-1}$ = last previous position, calculated at $\Delta t$ interval before the present instant.

Equations 2a–2c, inclusive, imply a sampled-data type of control where the sampling interval is the time $\Delta t$ as hereinabove utilized. However, restriction to operation with a single multiplexed controller functioning on a sampled-data basis is not theoretically essential, and this invention was devised to provide superior flexibility by departing from this limitation as a first principle.

For simplicity in the description, and in consonance with the existing practice, it is assumed that the deviation from set point is available as input to the controller of this invention, this deviation being defined:

(3) $\quad \Delta F = e_a = F - F_0,$ where $F$ = the measured variable and
$F_0$ = the set point.

Also, a normalized system of variables is hereinafter utilized, specifically one in which the variables $F$, $F_0$ and $V$ have values ranging from 0 to 1023.

Finally, since proportional and reset control operations are effectuated independently of one another according to my invention, the applicable control equations hereinbefore set forth are rewritten as follows:

(4a) $\quad V = V_p + V_r$ (4b) $\quad V_p = K_1 \Delta F$ (4c) $\quad V_r = \frac{K_1}{T} \int_0^t \Delta F \, dt$ where $V_p$ = the component of valve position contributed by proportional action and
$V_r$ = the component of valve position contributed by reset action.

Confining attention first to the proportional term of Equation 1, the three counterpart expressions in terms of position, velocity and incremental position suitable for digital handling can be written:

I(1a) $\quad V_p = K_1 \Delta F$ which is the continuous, position form,

I(1b) $\quad \frac{dV_p}{dt} = \frac{K_1}{\Delta t_p}(\Delta F_n - \Delta F_{n-1})$ which is the incremental position inserted at $\Delta t_p$ intervals period $\Delta t_p$ form, and I(1c) $\quad \Delta V_p = \frac{K_1}{\Delta t_p}(\Delta F_n - \Delta F_{n-1})$ $\quad = \frac{K_1}{\Delta t_p} \Delta F_n - V_{p_{n-1}}$ which is the incremental position inserted at $\Delta t_p$ intervals form.

Referring to FIGS. 1 and 2, illustrative apparatus for effectuation of process control in accordance with Equations I(1a)–I(1c), inclusive, is detailed. Here C is an analog comparator receiving, as one input, error signal $e_a = \Delta F$, sensed from the process by conventional equipment not detailed, and opposing it with a counterbalancing feedback signal $e_a'$ derived as hereinafter described. The DC unbalance signal output from C, indicative of the fact of nonequality of $e_a$ and $e_a'$, and the sense or polarity of the nonequality, is delivered concurrently to the directional gate of accumulating register E, in designation of polarity, via leads 14 and 15, and to OR gate 10 as one input to AND gate 11. The other input to AND gate 11 is a DC pulse counting signal $f_1$, typically supplied at a frequency of 100 kcs. where a solid-state operator is utilized, or 400 c.p.s. for a stepping motor-potentiometer type or pulse motor type operator.

The apparatus operating on the process (hereinafter called the "operator") can typically be a pulse-actuated motorized valve denoted schematically at V, which is provided with signal polarity advisory leads 14' and 15' branched from leads 14 and 15, respectively, and with pulse driving signal supply lead 16 connected to the output side of AND gate 11. The counting signal applied to register E is concurrently supplied from the output of gate 11, through the agency of a constant $k_2$ multiplier device, hereinafter detailed.

One suitable design of counter register E in association with a co-operating D–A converter and $k_2$ multiplier device is that detailed in FIG. 2.

E in this design is a flip-flop reversible counter register with D–C output delivered to the individual inputs of the D–A converter, which, in this instance, is a conventional weighted ladder network such as that described in pages 4, 30 and 39 of the "A–D Conversion Handbook" published by Digital Equipment Corp., Maynard, Mass., copyright 1964, and also in United States Patents 2,539,623 and 2,718,634.

Register E can typically have a size providing four fractional bits, ten whole-number bits, i.e., of range up to $2^9$, and a sign bit, the binary point being indicated as between bits $2^{-1}$ and $2^0$.

The ladder network D–A converter functionally consists of a multiplicity of switches 19 closed either on their $k_1$ introduction upper contacts or on their lower contacts, which latter are maintained at a common reference potential corresponding to $e_a' = 0$, here assumed to be ground. Switches 19 are actuated individually by signals derived from individual bits of counter register E, to thereby deliver as continuous counterbalancing feedback signal $e_a'$, a D–C voltage of magnitude determined by the resistance progressively opposed to the voltage supply $k_1$ connected to the input side of each switch 19. To clarify the explanation, switch 19' is detailed schematically as a relay, although in actual practice solid state equivalents are preferred, the D–C signal from the $2^0$ bit being supplied to the operating coil to close the switch arm on its upper contact and thereby introduce voltage $k_1$ into the ladder network. As will hereinafter be explained, $k_1$ is preselected in magnitude to constitute a multiplier effective in the implementation of the control equation.

Agency $k_2$ is also effectively a multiplier, introduced by connecting pulse source $f_1$ input to a preselected one of the bits of counter register E by manual setting of a multipoint switch as shown.

In operation, process control imposition is effected in the course of the count-up or -down of counter register E in accordance with exact counterbalancing of the process signal $e_a$ against the feedback signal $e_a'$, any existence of an unbalance resulting in a count change within register E as a function of the magnitude of the unbalance, with count direction either forward or backward as determined by the comparator output polarity manifested via leads 14 and 15. Thus, any unbalance signal originating from comparator C, applied through OR gate 10 to AND gate 11, applies counting pulses from source $f_1$ to the appropriate bit position of counter register E preselected manually by switch $k_2$, while simultaneously delivering actuating pulses to operator V acting directly on the process under control, which latter then makes the appropriate corrections to the process with the objective of reducing $e_a$ to zero.

The proportional relationship between the position of V and the error signal $e_a$ is evident from the following:

Since $k_1$ is the proportionality constant relating the digital count within register E and the output of the D–A converter:

I(2) $$e_a' = k_1 E$$

Similarly, $k_2$ is the proportionality constant relating the increment added to the E register and the number of pulses applied thereto. However, since each pulse applied to the E register is also applied to the V operator, I(4) $$e_a' = k_1 E = k_1 k_2 V_p$$

Combining Equations I(2) and I(3):

I(4) $$e_a' = k_1 E = k_1 k_2 V_p$$

But, since $e_a = e_a'$ at balance as detected by comparator C, $$E = \frac{1}{k_1} e_a$$

and then

I(5a) $$V_p = \frac{1}{k_1 k_2} e_a$$

Now, since $k_1$ and $k_2$ are constants

I(5b) $$K_1 = \frac{1}{k_1 k_2}$$

where $K_1$ is a new constant, whereupon

I(6) $$V_p = K_1 e_a$$

which is identically the proportional control term of Equation 4b hereinbefore postulated, so that the control action can in truth be considered continuous proportional control, provided that: (1) the frequency $f_1$ is such that the period of one cycle is very short compared to the process time constant, and (2) the controller as described is continuously connected to the process, both of which conditions are fulfilled by the design described.

However, the apparatus can also be used intermittently, if this is desired, conversion to a multiplexed system being readily accomplished, preferably servicing not more than 4 or 5 loops as a general rule, by the addition of the memory equipment M shown schematically in broken line representation in FIG. 1.

Memory M stores the last previously measured value of E for a given loop under surveillance and loads it into register E at the beginning of a given loop control cycle, after which the given loop is sampled (as by a conventional scanning switch or the like, not detailed) and the count for this loop allowed to proceed with accompanying V operator actuation until a new $e_a$, $e_a'$ balance is reached, with storage of the newly attained E value made within memory M, at which point the cycle is complete and a new cycle commenced for the next loop under control.

This operation is incremental in nature and can be represented as

I(7) $$\Delta V_{p_n} = \frac{1}{k_1 k_2} (e_{a_n} - e_{a_{n-1}})$$

where $n$ = present value and $n-1$ = last preceding value.

In accordance with Equation I(4), the corresponding increment in the E register is I(8) $$\Delta E = \frac{1}{k_1} (e_{a_n} - e_{a_{n-1}})$$

If this action is repeated for any given loop at regular intervals $\Delta t$, the valve action is described as I(9) $$v = \frac{\Delta V_n}{\Delta t} = \frac{1}{k_1 k_2 \Delta t} (e_{a_n} - e_{a_{n-1}})$$

But, as previously defined, $$K_1 = \frac{1}{k_1 k_2}$$

so that

I(10) $$v = \frac{K_1}{\Delta t} (e_{a_n} - e_{a_{n-1}})$$

which is, identically, the incremental position form of the velocity Equation I(1b) hereinbefore developed.

To illustrate the operation of the apparatus constructed according to FIGS. 1 and 2, let the minimum detectable differential (unit resolution) of comparator C be $\epsilon$. Also, the voltage supply $k_1$ to the D–A converter is such that, when $k_1 = 1$, a unit change in the value of E gives rise to a change in $e_a'$ of $\epsilon$. Also, $k_2$ is defined as follows:

$k_2 = 1$, corresponds to the count input to the $2^0$ bit
$k_2 = 2$, corresponds to the count input to the $2^1$ bit
$k_2 = 4$, corresponds to the count input to the $2^2$ bit
$k_2 = \frac{1}{2}$, corresponds to the count input to the $2^{-1}$ bit, and so forth.

Now, let $k_1 = k_2 = 1$. Then, with the system initially at balance, let $e_a$ change by an amount $\epsilon$. This allows a pulse from source $f_1$ to increment the E register by one count (applied to the $2^0$ position via the $k_2$ switch, manually placed at the setting shown in FIG. 2), thus incrementing $e_a'$ by the amount $\epsilon$, effecting rebalance of the comparator C. This single count also increments V. Thus, in accordance with Equations I(3) and I(4), $$E = V = e_a$$

Now, let $k_1 = 1$ and $k_2 = 2$.

Then unit increase in $e_a$ passes a pulse from source $f_1$ to the $2^1$ bit of the E register, thus increasing the counter value by 2, with a corresponding increase of $2\epsilon$ in $e_a'$. This is greater than the required balance value, so that $e_a$ does not exceed $e_a'$ until $e_a$ increases by more than two units. The change in the value of E is 2 under these circumstances; however, the value of V has only been increased by 1. (Intermediate values taken by $e_a$ may cause hunting of register E, which can, however, be eliminated, if necessary, by RC damping in the D–A converter.)

Thus, in accordance with this case only, pursuant to Equation I(4), $$E = e_a$$

while $$V = e_{a/2}$$

Similar actions occur at other values of $k_2$.

Where $k_2$ is set equal to unity and $k_1 = 2$ (as can be readily accomplished by a potentiometer, not shown, interposed in circuit between the $k_1$ power supply and the D–A converter of FIGS. 1 and 2), unit variation in the value of E results in a change in $e_a'$ of $2\epsilon$. Then, in a manner similar to the previous case described, a two-unit increase in $e_a$ results in a new balance condition, while the accompanying increase in both E and V is only one unit.

Therefore, in accordance with Equation I(4)

$$E = e_{a/2}$$

and $$V = e_{a/2}$$

Similar actions take place at other values of $k_1$.

From FIG. 2 it will be seen that there are no direct connections between any of the $2^{-n}$ flip-flops of the E register and the D–A converter, all $2^{-n}$ flip-flops being reserved to $k_2$ value selection solely, with ultimate output to the D–A converter after count-up then being effected through the $2^0$ flip-flop.

An alternative method of effectuating the proportional action hereinbefore described is depicted schematically in FIG. 3, wherein a pulse motor $P_m$ combined with a potentiometer is substituted for the counter register—D–A converter combination. Here $k_1$ is introduced as a variable voltage supplied from voltage source 12 to the potentiometer 18, the tap of which is positioned by pulse motor $P_m$ through the drive connection indicated in broken line representation, under which conditions the value of E is implicit in the potentiometer shaft position. If desired, external readout of E is readily achieved by addition of a code-wheel readout accessory keyed to the potentiometer shaft.

The constant $k_2$ is not provided in this embodiment, although it can be readily introduced by addition of extra counter equipment.

Operation is exactly equivalent to that of the apparatus of FIGS. 1 and 2 where $k_2=1$, i.e., each pulse from source $f_1$ increments motor $P_m$ one count, thereby adjusting the slide of potentiometer 18 to a new balance position Considering now the reset term from Equation 4(c).

$$V_r = \frac{K_1}{T}\int_0^t \Delta F\, dt$$

From this it is seen that the valve position can be established by integration, by operator V, of the valve velocity $v_r$:

II(1) (a)
$$V_r = \int_0^t \frac{dV_r}{dt} dt$$

(b)
$$\frac{dV_r}{dt} = \frac{K_1}{T} e_a = v_r$$

from which it is seen that the valve velocity is also expressible as a proportional function of the error signal $e_a$, making it practicable to effect the reset control part of the total control contemplated by this invention by impressing on the operator V a velocity proportional to the error signal. The velocity impressed can be one of a selective group of predetermined velocities, as taught in applicant's U.S. Patent 3,201,572; however, the continuous nature of the instant control system makes selection and use of a fixed sampling time, over which the velocity is maintained constant, unnecessary.

A preferred apparatus for effectuation of the selected velocity type of reset action is shown schematically in FIG. 4, in which the same register E is shown in connection with the ancillary equipment necessary to reset control, the equipment of FIGS. 1–3 required for proportional control being also shown. It will be understood that this embodiment imposes both continuous proportional and reset control, each occurring during separate phases of the pulse signal supplied to velocity generator 22 as hereinafter described.

Referring to FIG. 4, individual bit positions of the E register are ANDED through an array of velocity selection gates indicated at 21 with individual outputs of a velocity generator 22, so that the count progression occurring in the E register is accompanied by the impression of velocity pulse trains of preselected frequency rate through OR gates 23 and 24 in turn to operator V. The following method of velocity pattern selection is taught in detail by applicant in his copending Application Ser. No. 275,651 filed Apr. 25, 1963, now issued as Patent 3,382,352.

Velocity generator 22 is simply a binary counter with pulsed input $2f_1$, so that each successive flip-flop of the generator halves the input thereto, providing, as the first division result, two phase outputs of $f_1$, one delivered via line 26 being reserved to proportional control effectuation whereas the other delivered via line 27 is reserved to reset control accomplishment through the agency of the individual AND gate 21 to which it is routed. Later frequencies in terms of even fractions of $f_1$ include $f_{1/2}$, $f_{1/4}$, $f_{1/8}$, $f_{1/16}$, etc., each made available at an individual switch contact making up a bank through which selection of a velocity range at which operation is to be conducted is made by manual setting of switch $t_2$, a three-blade gang switch, in this instance closed on only the three contacts $f_1$, $f_{1/2}$ and $f_{1/4}$ for purposes of example.

Switch $t_1$ is a gang switch through which preselected bits of register E are ANDED simultaneously and with relative order maintained by manual setting before operation is commenced, and a mechanical coupling connection 28 is provided between $t_1$ and switch $k_2$ to always maintain the ratio of $t_1/k_2=1$ for the reason hereinafter described. This mechanical coupling is of conventional design coordinating the operation of the two switches $t_1$ and $k_2$ in the same direction in preservation of a ratio of inter movement making the normalized ratio of their settings always unity, which provides interacting control in accordance with the normally used proportional plus reset algorithm.

Operation is as follows, assuming switch $t_1$ to be set as shown with the lowest velocity selection gate 21 connected to the $2^0$ bit of the E register. Then, since the effective pulse rate applied to operator V is determined by the most significant 1 in the E register, and since the available velocities vary in a binary progression, the value of $v_r$ is indeed proportional to the number in the E register, limited only by the resolution of the specific selected velocities. If, now, switch $t_1$ is moved one bit right from its position shown in FIG. 4, i.e., $t_1=\frac{1}{2}$, i.e., so that the lowest velocity gate 21 is connected to the $2^{-1}$ bit, the velocity for a given E will be doubled, that is:

II(2) $\qquad v_r = E/t_1$

Also, if switch $t_2$, assumed for the state $t_2=1$ in the position shown, is moved towards a lower velocity, e.g., $t_2=\frac{1}{2}$, the velocity will be halved. Thus, II(3)
$$v_r = \frac{t_2}{t_1} E$$

But, from I(4), $$E = \frac{1}{k_1} e_a$$

so that, combining,

II(4)
$$v_r = \frac{t_2}{t_1}\frac{1}{k_1} e_a$$

Then, combining Equations II(4) with II(1b) and I(5):

$$\frac{K_1}{T} = \frac{t_2}{t_1}\frac{1}{k_1} = \frac{1}{\frac{k_1 k_2}{T}}$$

so that

II(5)
$$T = \frac{t_1}{t_2 k_2}$$

If, now, switches $t_1$ and $k_2$ are mechanically coupled as hereinbefore described to move in the same direction, so that the product $t_1/k_2=1$, then:

II(6) $\qquad T = 1/t_2$

The reset system of FIG. 4 is entirely suitable for use with the continuous system of FIG. 1; however, an alternate method is available for providing the reset function in terms of incremental position, this operating by correction to the valve position made at predetermined time intervals.

Reset term incorporation incrementally is accomplished by modifying the proportional term apparatus of FIG. 1 as shown in FIG. 5.

The equipment of this figure is identical with that shown in FIG. 1, except that switches $S_1$, $S_2$, and $S_3$ together with manually variable timer 30 are added. Timer 30 is provided to repetitively operate the switches $S_1$, $S_2$ and $S_3$, by mechanical connections denoted schematically in broken line representation in FIG. 5, in a fixed relationship one with another after time intervals of $\gamma$. The blade of switch $S_1$ is then switched from the input signal $e_a$ contact to a contact 31, which is maintained at a potential corresponding to $e'_a=0$, denoted here as ground for purposes of explanation. Simultaneously, switch $S_2$, a reversing switch connected in series with polarity leads 14' and 15' running from comparator C is actuated to reverse leads connection. $S_3$, the normally closed switch in circuit with power source $f_1$, remains closed during this period.

It will be understood that operation in the proportional mode is exactly as hereinbefore described with reference to FIGS. 1–4. Then, when timer 30 operates switches $S_1$, $S_2$ and $S_3$ at preselected time intervals, input $e_a$ being in balance with $e'_a$, the contents of the E register are proportional to the last-sensed error. Closure of switch $S_1$ upon grounding contact 31 immediately, in effect, opposes the counted up input $e'_a$ to a zero value $e_a$, thereupon actuating the E register to reverse count to zero. However, with the output leads effectively reversed by operation of switch $S_2$ to its reverse position, and with switch $S_3$ remaining closed, there is an $f_1$ pulse input of the same directional sense as the last preceding proportional actuation to the V operator for a time duration determined by the count down of the E register.

At the completion of this action, which can be optionally signaled by comparator C reaching balance or, preferably, by arbitrary termination of a fixed time interval after initiation, switches $S_1$ and $S_2$ are returned to their normal state (i.e., for proportional mode operation) and switch $S_3$ is opened, removing the pulse source from the operator V. This immediately permits the system to return to its initial condition of balance with the error $e_a$, but allows the V operator to remain at its new position. This restoration of the E register to its former count-up state can be accomplished using the normal valve operating frequency $f_1$, but, since no valve operation is desired during this action, a much higher frequency can be used to expedite return to the active state. Following count-up of the E register to its former state, switch $S_3$ is closed as a terminal operation of the operating cycle of timer 30, thereupon restoring the apparatus to its normal full proportional mode operation.

Since the action of the apparatus of FIG. 5 is to increment operator V by an amount proportional to the quantity stored in the E register at $\gamma$ time intervals, the increment added to V at the $n$th cycle (referring to Eq. I(6)) can be written as:

II(8a)
$$\Delta V_{r_n} = K_1 e_{a_n}$$

and the average velocity over the $n$th cycle period will be

II(8b)
$$v_r = \frac{dV_r}{dt} = \frac{\Delta V_r}{\gamma} = \frac{K_1}{\gamma} e_a$$

The valve position integrated over a long period ($t$ is $\gg \gamma$) will then be II(9)
$$V_r = \int_0^t v_r dt = \frac{K_1}{\gamma} \int_0^t e_a dt$$

which is the form of the reset equation of Equation 4(c) with $\gamma = T$

If the difference circuit previously described provided to develop $e_a$ as input signal is to be eliminated, the measured variable F can be used directly. Where it is desired to effect set point positioning directly from a central computer it is convenient to follow this approach.

The proportional plus reset equation written in terms of set point and measured variable, instead of error signal, is:

III(1)
$$V = K_1(F-F_0) + K_2 \int_0^t (F-F_0) dt$$

from whcih the proportional term can be written

III(2)
$$V_p = K_1 F - K_1 F_0$$

III(2)
$$V_p = K_1 F - K_1 F_0$$

Referring to FIG. 6, a preferred apparatus for effectuation of this type of control utilizes the same type D–A converter described with reference to FIG. 1, together with an identical E register, typically a 10-bit reversible counter. The output F' from this sub-assembly is opposed through a comparator C to the measured variable F, which constitutes the input from the process under control sensed through the normally closed contact F of a three-contact switch $S_1$.

As before, the output from C passes to an AND gate 11 where it is ANDED with the operator-actuating pulse frequency $f_1$, which delivers the pulse actuation signal via lead 16 through the two F contacts of switch $S_4$ and normally closed switch $S_3$ to operator V. Simultaneous count up of register E is effected through branch lead 17 running to the zero bit position.

The polarity sense of switch 38 is obtained by running branch control leads 14'' and 15'' from the individual switch contacts 38' and 38'', respectively, to the polarity-determining leads of operator V.

The set point analog voltage $F_0$ is generated by a potentiometer 36, connected across voltage source 40, the tap 36' of which is driven by pulse motor 37 powered by a pulse source delivering a steady pulse output $f_2$ through the manually operated switch 38. Branch connections 39' and 39'' from these contacts merge into lead 39 running to the right-hand $F_0$ contact of switch $S_4$, the left-hand $F_0$ contact of which is merely a dummy contact for the second, off-normal position of the left-hand switch blade of $S_4$. Switches 38 and $S_4$ are ganged for operation in unison through the mechanical connection denoted schematically at 40, so that closure of switch 38 or either of its contacts 38' or 38'' simultaneously closes switch $S_4$ on its $F_0$ contacts.

For initial simplicity in describing the operation, the constant $K_1$ of Equation 2 is assumed to be unity and the system is assumed to be normalized as follows:

F range—0–1000 units
$F_0$ range—0–1000 units
V range—1000 units
E register capacity—0–1023 (10 bits).

System operation consists of two separate phases corresponding to the two terms of Equation III(2). The first portion, $K_1 F$, of the composite operation of V is accomplished by the action of the A–D converter exactly as hereinbefore described, in that a unit change in F results in a unit change in the count within register E, and also in a unit change in the position of operator V. Thus, III(3a) $\quad E = F$ III(3b) $\quad V_{p_1} = K_1 F$ (where $K_1 = 1$).

The second term, $K_1 F_0$, is introduced by the action of pulse motor 37, which acts to adjust the set point potentiometer 36, thereby establishing the set point voltage $F_0$. When switch $S_4$ is placed in the $F_0$ position, and the motor 37 actuation switch 38 is manually operated, the V operator will operate an equal number of units in the polarity sense designated via branch 14'' or 15''. Thus, the second component of operation of V is III(3c) $\quad V_{p_2} = K_1 F_0$ (where $K_1 = 1$).

It will be understood that the left-hand switch blade of $S_4$, when closed on its associated $F_0$ contact, opens the circuit with the E register, so that operation of the latter is effectively prevented during the time interval in which set point adjustment is being made.

From the foregoing, it is seen that the combination actuation represented by Equations III(3b) and III(3c) accomplishes the proportional algorithm of Equation 2 for the condition where $K_1=1$.

The reset term in the control algorithm, from Equation III(1) is:

III(4a) $$V_r = K_2 \int_0^t (F-F_0)dt$$

which may be rewritten:

III(4b) $$V_r = K_1/T \int_0^t (F-F_0)dt$$

under the conditions that the quantity $(F-F_0)$ is added to the previously existing summation at time intervals of $\gamma$ (see Eq. II(9)).

Reset term incorporation is accomplished by providing switching apparatus of the type already described in FIG. 5, including a timer 30-actuated switch $S_1$, analogous to switch $S_1$ of FIG. 5, which has, in addition to the contacts F and $F_0$, a contact 31', which latter is maintained at a common reference potential corresponding to $F'=0$, here assumed to be ground. There is also provided a timer-actuated reversing switch $S_2$ interposed in series electrical circuit with leads 14' and 15' carrying the output signal from comparator C, and a timer-actuated switch $S_3$ just ahead of operator V.

In operation, on closure of switch $S_1$ on contact $F_0$ and with switch $S_2$ moved to its reversed position, the D–A converter will immediately start to rebalance against the new input furnished by $F_0$. As this occurs, the pulse from source $f_1$ will, with switch $S_2$ moved to reversed position, drive V in a direction such as to bring F into agreement with $F_0$; e.g., it will tend to close a typical valve-type operator V which is connected for operation such as to open with decrease in F when the condition exists that $F>F_0$. At the conclusion of this operation, preferably as indicated by the lapse of a predetermined time interval on the part of timer 30, or by detection of a balanced condition at the comparator C output, $S_1$ is switched back to its original position on contact F, allowing rebalance to the F signal to ensue. During this last interval $S_3$ is opened by timer in order to prevent addition of these rebalance pulses to the position of operator V. Thus, exactly as previously described with respect to FIG. 5, magnitude of the reset term is established as predetermined by the frequency with which this term is applied to operator V during a given period of elapsed time, which, in turn, is selected by manual setting of timer 30. The proportional and reset terms having independently actuated operator V, the resultant position of V is the sum of the two, accomplishing complete control according to the algorithm.

With slight modifications, such as the addition of individual grounding contacts 31' on switch $S_1$, central supervisory control of multiple loops is readily obtainable, as by the system shown schematically in FIG. 7, in which solid lines indicate information transmission and broken lines control effectuation.

Here the supervisory control is effectuated through a central computer 43 to which all of the individual process loops #1, #2, etc., are connected through multiplexer 44, of conventional design. For simplicity in representation, only some of the principal components of the individual loops under control are shown in FIG. 7, timer details being omitted.

The apparatus detailed is adapted to furnish central computer 43 with the digital values of F and $F_0$ for each individual loop in turn and, thereafter, allow computer 43 to adjust the value of $F_0$ for each loop. Thus, for example, in operation, when computer 43 samples loop #1 via multiplexer 44, a switching signal is sent to the controller deactivating the normal control functions while leaving those portions shown in FIG. 7 in active condition. Then switch $S_1$ is connected to contact $F_0$ by a control signal applied as denoted by broken line control convention 48 and computer 43 furnishes pulses of frequency equal to $f_1$ through control line 49 to cause rebalance of the system, at the same time counting these pulses. When balance is reached through the circuit maintained on contact $F_0$, as signaled to computer 43 via lines 51, the computer stores the attained value (equal to $F-F_0$), switches $S_1$ to $F'=0$ contact 31', and continues the balancing operation. When the system again reaches balance, the new number (equal to $F_0$) is recorded, the entire operation thus determining the existing values of F and $F_0$.

If it is desired to reset the set point, as hereinbefore taught with respect to FIG. 6, using computer 43, this is accomplished by furnishing the correct number of pulses from the computer to the set point motor 37 via control line 50.

At the completion of these operations, controller #1 is returned to normal operation, and the next loop (e.g., loop #2, or any other loop programmed to follow in chronological succession) is switched into circuit via multiplexer 44.

In the interests of simplifying the presentation, the system hereinbefore described has been directed to the special situation involving proportional-plus-reset control, with the proportional control constant $K_1$ (i.e., the gain) equal to unity. If it is desired that the gain have some other value, preferred apparatus for this accomplishment is shown in FIGS. 8a, 8b and 9.

Equations III(3a) and III(3b), which, respectively, state $E=F$ and $V=K_1F$, relate the number of pulses actuating register E to the number actuation of operator V, whereas Equation III(3c) expresses a parallel relationship as regards $F_0$ in the form $V=K_1F_0$. A convenient way of incorporating constant $K_1$ at any preselected value is through the agency of a binary counter suitably connected into the system already described.

A reasonable range of values for $K_1$ is from $\frac{1}{32}$ to 32, and sufficient resolution can be obtained by selection of powers of 2 from $2^{-5}$ to $2^{+5}$, although unit resolution can be obtained if required.

Referring to FIG. 8a, there is shown as independent $K_1$ counter 52 adapted to actuate operator V at a preselected rate greater than $e$, i.e., $K_1>1$. Thus, counter 52 is provided with a switch contact bank connecting to individual positions of the counter, enabling manual shift of switch arm 53 to any preselected point within the range. This effectively divides the pulse input to register E by the factor equivalent to counter 52 insertion position, since the E register input is now introduced through binary counter 52 and lead 54, instead of directly through lead 17 as shown in FIG. 6. At the same time, every input pulse actuates operator V directly through lead 16.

For $K_1$ values less than 1, a circuit modification to FIG. 6 such as that shown in FIG. 8b is utilized. Here, it is desired that $f_1$ pulses supplied from AND gate 11 via branch lead 17 actuate register E to maintain comparator C in balance, but that only every $k$th pulse activates the V operator. Accordingly, the V operator actuation pulses are routed through binary counter 56 with position of signal insertion manually selected through tap 53' and its associated contact bank. This effectively divides the pulse input to the V operator compared with that going to the E register by the factor selected by the setting of tap 53'. This same scheme can be readily incorporated in the apparatus of FIG. 6 by interposing a counter, such as 56, between switch $S_3$ and operator V.

It will be noted that the E register in both FIGS. 8a and 8b dispenses with fractional bit counters, so that input to the register is at the $2^0$ position in both instances.

Also, insertion of the $k_2$ constant can now be combined with $K_1$ selection as a function of the tap 53, 53′ position settings with respect to counters 52 and 56, respectively.

A preferred embodiment of the apparatus of this invention adapted to full automatic operation is detailed schematically in FIG. 9.

It can be seen that elements as hereinbefore described in FIGS. 1–8, inclusive, or their equivalents, are all utilized here; however, in addition, a central control logic block 60 is provided, which accomplishes precise sequential, or, as desired, concurrent operation of the several components with respect to one another. The solid connecting lines of FIG. 9 denote information supply channels, whereas the broken lines denote control channels.

It is preferred, in this design, to utilize three identical reversible counters 61, 62 and 63, each provided with its own D–A converter, of which the first serves as the E register, the second as a substitute for the $F_{0_m}$ pulse motor 37 hereinbefore described, and is thus denoted $F_0$ to identify the term with which it is concerned, and the third as the V operator per se, the count input in all cases being to the least significant bit.

A single unidirectional counter 64 is provided as count divider for constant $K_1$ inter-relation of counts to either E register 61 or V operator 63 at will, count inputs being selected as to insertion through tap 65 manually set by switch $K_1$ acting through central control 60, and the count output delivered from the most significant bit.

Voltage comparator C receives, via line 68, as one input the analog signal $F'$ corresponding to the count achieved in E register 61, and, as the other, the process input signal F, $F_0$ or R selected by appropriate setting of switch $S_1$ effectuated via connection 70 running from central control block 60.

The unbalance output from comparator C is routed to central control 60 via connection 71, and the E and V registers are thereafter counted in the corresponding polarity senses and magnitudes by signals from control passed to E register 61 and V register 63 via control connections 72 and 73, respectively.

Switch $K_1$ is the manual proportion band setting device (typical range $2^{-5}$ to $2^5$) operative to preselect the $K_1$ value of Equation 1 in its greater than unity or less than unity senses by appropriate setting of tap 65 of K counter 64 operated from switch $K_1$. T is a manual switch preselecting the time interval at which timer $\gamma$ accomplishes reset control through central control 60.

The automatic pulse counting source is again $f_1$, introduced directly to central control 60, a second lower frequency source $f_2$ being provided for predetermined magnitude selection of $F_0$ through manual switch MF, $F_0$ to register 62 and its D–A converter and for manual override operation of V directly, through switch MV. Lead 74 is a polarity signal lead.

The normal operation of the apparatus of FIG. 9 is accomplished automatically by central control 60 and can be conveniently described in terms of the separate steps conducted, namely:

(a) Proportional action—Switch $S_1$ closed on F contact.

E register 61, with its D–A network, continuously balances its analog output signal $F'$ as a function of the numerical contents in register E against F, the count pulse $f_1$ stepping the E register so that a unit change in the digital contents of E results in corresponding unit change in $F'$, thereby balancing a unit change in the analog input F.

Pulse input to E register 61 simultaneously operates V register 63, qualified, however, by the setting of switch $K_1$, i.e., (1) with $K_1$ switch set to 1, pulses add to both E and V simultaneously and equally, (2) with $K_1 > 1$ counter 64 is connected so that pulse source $f_1$ directly operates V but operates E through the counter, so that for each unit change in E, $2^k$ units (where $k=$ the exponent corresponding to the $K_1$ switch range of positions $2^{-5}$ to $2^5$) change occurs in V and (3) when $K_1 < 1$ counter 64 is connected so that pulse source $f_1$ directly operates E, but operates V through the counter, so that for $2^k$ units change in E, only one unit change occurs in V. The pulse input to the proper bit of counter 64 is predetermined by the setting of tap 65 through switch $K_1$ and the count direction of V is such as to furnish the correct polarity, an increase in the E count resulting in a decrease in the V count.

(b) Proportional action—Switch $S_1$ closed on $F_0$ contact.

This action introduces the second term, i.e., $(-K_1 F_0)$ of the control algorithm. This step occurs only when manual change is made in the set point, this being accomplished by the attendant moving switch MF to either increase or decrease the set point in a desired amount.

Under these conditions, introduction of the F input into comparator C is temporarily discontinued and pulse source $f_2$ is connected to $F_0$ register 62, causing it to step in the appropriate direction and increment analog output $F_0$ accordingly.

This causes V register 63 to automatically step to a new setting as determined by the existing setting of K counter 64, in exactly the same manner as hereinbefore described under (a). Upon release of the manual MF switch, the controller immediately reverts to the continuous proportional action —F mode of (a).

(c) Reset action—Switch $S_1$ closed on $F_0$ contact and reversing switch $S_2$ (within central control 60) closed to reverse position.

The reset action introduces the third (summation) term of the control algorithm, i.e., $$\frac{K_1}{T} \int_0^t (F - F_0) dt$$

accomplished by adding to V counter 63 a quantity numerically equal to $(F - F_0)$, and repeating this addition at predetermined regular time intervals $\gamma$ selected manually via switch T adjusting the period of interval timer $\gamma$.

During this operation, comparator C rebalances E register 61 against internally generated signal $F_0$ and, as E rebalances, pulse source $f_1$ introduces its count to both E register 61 and V register 63; however, since reversing switch $S_2$ is now in reversed position, a decrease in value of E during rebalance, assuming $F > F_0$, results in a decrease in the count of V, i.e., a reversal of the normal proportional —F mode action.

When E has balanced again $F_0$, pulse source $f_1$ is disconnected from V (by operation of a switch $S_3$ as hereinbefore described, within central control 60) whereupon comparator C is reconnected to the F contact and E is allowed to rebalance thereto. The system then reverts to the normal proportional —F mode action.

It is contemplated that the apparatus of FIG. 9 be optionally utilized in conjunction with a computer (not shown) employed for supervisory control as hereinbefore described with reference to FIG. 7.

In such a case, certain information has to be transferred to or from the computer, as follows:

(1) *Information to the computer.*—Upon receipt of the transfer command, normal control functions are inhibited, except that, if a reset cycle is in progress, this takes priority over information tranfer, and the latter is delayed until the reset cycle is completed.

Switch $S_1$ is moved to $F_0$ contact position during this transfer, whereupon E balances against $F_0$, the pulse train $f_1$ now being delivered via the computer. This is followed by switch $S_1$ movement to the R contact (which is shown as ground in FIG. 9, but is intended to in general be a reference potential level against which $F_0$ is based, as hereinbefore explained). Balance against R then ensues, again with pulse input supplied via the computer. Finally, switch $S_1$ is moved back to its F contact and the system allowed to rebalance the E register against F, during which rebalancing the $f_1$ pulse source shown in FIG. 9 is utilized.

(2) *Information from the computer.*—The operation of incrementing the value of $F_0$ by a specific number of pulses furnished by the computer can be conducted at all times except during the reset cycle. Subject to this limitation, the V operator is incremented in normal fashion in the same manner as accomplished in manual $F_0$ adjustment, it being understood that any additionally provided manual $F_0$ adjustment is inhibited during automatic $F_0$ adjustment.

From the foregoing it will be understood that this invention may be modified in numerous respects without departure from its essential spirit, and it is accordingly intended to be limited only within the scope of the attached claims.

What is claimed is:

1. A process controller adapted to service an individual process loop, or a relatively small number of individual process loops collectively, comprising, in combination,
   a null-balancing comparator,
   means delivering as a first input to said comparator a process signal which is a function of a process condition to be controlled,
   means delivering as a second input to said comparator in opposition to said first input a counterbalancing feedback signal,
   (1) an electrical pulse source, (2) gating means and (3) first and second pulse-actuated means in series electrical circuit one with another in the numbered order recited, and
   means connecting the unbalance signal output from said comparator to said gating means,
   said first and second pulse-actuated means generating, respectively, responsive to said unbalance signal output, said counterbalancing feedback signal and a control effectuation signal applied to apparatus operating on said process in a sense adjusting said process signal to a predetermined value.

2. A process controller according to claim 1 wherein said first pulse-actuated means generating, responsive to said unbalance signal output said counterbalancing feedback signal, comprises an unbalance signal output polarity-responsive pulse-actuated digital counter means.

3. A process controller according to claim 1 wherein said first pulse-actuated means generating, responsive to said unbalance signal output said counterbalancing feedback signal, comprises an electrical pulse motor driving the tap of a powered potentiometer network, said counterbalancing feedback signal being taken off from said tap.

4. A process controller according to claim 1 wherein said process signal is an error signal, $e_a = F - F_0$, where $F =$ the measure of a preselected process variable and $F_0 =$ the predetermined setpoint of said preselected process variable, and said counterbalancing feedback signal is an error signal $e_a'$.

5. A process controller according to claim 1 wherein said first pulse-actuated means generating responsive to said unbalance signal output said counterbalancing feedback signal comprises a primary pulse-actuated digital counter having interposed in series electrical circuit therewith between it and said electrical pulse source, and in parallel electrical circuit with said second pulse-actuated means generating said control effectuation signal applied to said apparatus operating on said process in a sense adjusting said process signal to a predetermined value, an auxiliary feed-through digital counter transmitting a preselected fraction of the pulse output of said electrical pulse source to said primary digital counter during transmission of the full pulse output of said electrical pulse source to said second pulse-actuated means generating said control effectuation signal.

6. A process controller according to claim 1 wherein said first pulse-actuated means generating responsive to said unbalance signal output said counterbalancing feedback signal comprises a primary pulse-actuated digital counter having interposed in parallel electrical circuit therewith and in series electrical circuit between said second pulse-actuated means generating said control effectuation signal applied to said apparatus operating on said process in a sense adjusting said process signal to a predetermined value and said electrical pulse source an auxiliary feed-through digital counter transmitting a preselected fraction of the pulse output of said electrical pulse source to said second pulse-actuated means generating said control effectuation signal during transmission of the full pulse output of said electrical pulse source to said primary pulse-actuated digital counter.

7. A process controller adapted to service either an individual process loop or a relatively small number of individual process loops collectively in conformity with the proportional-plus-reset control algorithm $$V = K_1 \Delta F + \frac{K_1}{T} \int_0^t \Delta F \, dt$$

where $V =$ the position of said apparatus operating on said process in a sense adjusting said process signal to a predetermined value, $\Delta F =$ the deviation of the controlled variable from the setpoint, i.e., the error signal $e_a$, $K_1 =$ a proportional constant and $T =$ the reset constant comprising, in combination,
   a null-balancing comparator,
   means delivering as a first input to said comparator a process signal which is a function of a process condition to be controlled,
   means delivering as a second input to said comparator in opposition to said first input a counterbalancing feedback signal,
   (1) an electrical pulse source, (2) gating means and (3) first and second pulse-actuated means in series electrical circuit one with another in the numbered order recited, and
   means connecting the unbalance signal output from said comparator to said gating means,
   said first and second pulse-actuated means generating, respectively, responsive to said unbalance signal output, said counterbalancing feedback signal and a control effectuation signal applied to apparatus operating on said process in a sense adjusting said process signal to a predetermined value, wherein said control effectuation signal is generated as a first component of magnitude supplying the proportional term $K_1 \Delta F$ of said control algorithm and a second component of magnitude supplying the reset term $$K_1/T \int_0^t \Delta F \, dt$$

of said control algorithm.

8. A process controller adapted to service either an individual process loop or a relatively small number of individual process loops collectively in conformity with the proportional-plus-reset control algorithm $$V = K_1 \Delta F + K_1/T \int_0^t \Delta F \, dt$$

where $V =$ the the position of said apparatus operating on said process in a sense adjusting said process signal to a predetermined value, $\Delta F =$ the deviation of the controlled variable from the setpoint, i.e., the error signal $e_a$, $K_1 =$ a proportional constant and $T =$ the reset constant comprising, in combination,
   a null-balancing comparator,
   means delivering as a first input to said comparator a process signal which is a function of a process condition to be controlled,
   means delivering as a second input to said comparator in opposition to said first input a counterbalancing feedback signal,
   (1) an electrical pulse source, (2) gating means and (3) first and second pulse-actuated means in series electrical circuit one with another in the numbered order recited, and means connecting the unbalance signal output from said comparator to said gating means.

said first and second pulse-actuated means generating, respectively, responsive to said unbalance signal output, said counterbalancing feedback signal and a control effectuation signal applied to apparatus operating on said process in a sense adjusting said process signal to a predetermined value, wherein said control effectuation signal is generated as a first component of magnitude supplying the proportional term $K_1\Delta F$ of said control algorithm and, incrementally, as a second component of magnitude supplying the reset term $$K_1/T \int_0^t \Delta F dt$$

of said control algorithm.

9. A process controller according to claim 8 wherein there is interposed a single contact switch in the electrical circuit between said gating means and said second pulse-actuated means generating said control effectuation signal applied to said apparatus operating on said process, an unbalance output polarity-responsive pulse-actuated digital counter generating, responsive to said unbalance signal output, said counterbalancing feedback, unbalance output polarity signal leads connected in electrical circuit through a reversing switch between said comparator and said second pulse-actuated means generating said control affectuation signal applied to said apparatus operating on said process, a two-position switch connected in series circuit on the process signal side of said comparator through a first positional contact with said means delivering said process signal which is a function of said process condition to be controlled, thereby causing said second pulse-actuated means generating said control effectuation signal to supply the proportional component $K_1\Delta F$ thereof, and through a second positional contact with a reference potential corresponding to the zero level of said counterbalancing feedback signal, an adjustable automatic timer actuating said two-position switch to close on said second positional contact and said reversing switch to reverse leads position in unison cyclically and at predetermined time intervals, thereby causing said second pulse-actuated means generating said control effectuation signal to supply the reset component $$K_1/T \int_0^t \Delta F dt$$

of said control effectuation signal applied to said apparatus operating on said process and, thereafter, actuating said single contact switch to open circuit position during the time interval required for count up return of said pulse-actuated digital counter to a level corresponding to said process signal which is a function of said process condition to be controlled upon restoration of said two-position switch to said first positional contact, after which the cycle is repeated.

10. A process controller according to claim 8 wherein there is interposed a single contact switch in the electrical circuit between said gating means and said second pulse-actuated means generating said control effectuation signal applied to said apparatus operating on said process, an unbalance output polarity-responsive pulse-actuated digital counter generating, responsive to said unbalance signal output, said counterbalancing feedback, unbalance output polarity signal leads connected in electrical circuit through a reversing switch between said comparator and said second pulse-actuated means generating said control actuation signal applied to said apparatus operating on said process, a three-position switch connected in series circuit on the process signal side of said comparator through a first positional contact with said means delivering said process signal which is a function of said process condition to be controlled, thereby causing said second pulse-actuated means generating said control effectuation signal to supply the proportional component $K_1\Delta F$ thereof, through a second positional contact with a reference potential corresponding to the zero level value of said counterbalancing feedback signal and through a third positional contact with setpoint $F_0$ potential maintained at preselected magnitude, an adjustable automatic timer actuating said three-position switch to close on said second positional contact and said reversing switch to reverse leads position in unison cyclically and at predetermined time intervals, thereby causing said second pulse-actuated means generating said control effectuation signal to supply the reset component $$K_1/T \int_0^t \Delta F dt$$

of said control affectuation signal applied to said apparatus operating on said process and, thereafter, actuating said single contact switch to open circuit position during the time interval required for count up return of said pulse-actuated digital counter to a level corresponding to said process signal which is a function of said process condition to be controlled upon restoration of said three-position switch to said first positional contact, and manually controlled means for supplying said second pulse-actuated means generating said control effectuation signal applied to said apparatus operating on said process the pulse equivalent of a change in setpoint $F_0$.

11. A process controller adapted to service either an individual process loop or a relatively small number of individual process loops collectively in conformity with the proportional-plus-reset control algorithm $$V = K_1\Delta F + K_1/T \int_0^t \Delta F dt$$

where V=the position of said apparatus operating on said process in a sense adjusting said process signal to a predetermined value, $\Delta F$=the deviation of the controlled variable from the setpoint, i.e., the error signal $e_a$, $K_1$=a proportional constant and T=the reset constant comprising, in combination, a null-balancing comparator, means delivering as a first input to said comparator a process signal which is a function of a process condition to be controlled, means delivering as a second input to said comparator in opposition to said first input a counterbalancing feedback signal, (1) an electrical pulse source, (2) gating means and (3) first and second pulse-actuated means in series electrical circuit one with another in the numbered order recited, and means connecting the unbalance signal output from said comparator to said gating means, said first and second pulse-actuated means generating, respectively, responsive to said unbalance signal output, said counterbalancing feedback signal and a control effectuation signal applied to apparatus operating on said process in a sense adjusting said process signal to a predetermined value, wherein said control effectuation signal is generated as a first component of magnitude supplying the proportional term $K_1\Delta F$ of said control algorithm and a second component constituting a preselected one of a multiplicity of velocity patterns supplying the reset term $$K_1T \int_0^t \Delta F dt$$

of said control algorithm.

12. A process controller according to claim 11 provided with means making available said electrical pulse source as a first phase supply generating said counterbalancing feedback signal and the proportional component $K_1\Delta F$ of said control effectuation signal in accordance with said control algorithm and as a second phase supply generating the reset component $$K_1/T \int_0^t \Delta F dt$$

of said control effectuation signal in accordance with said control algorithm.

13. A process controller according to claim 11 provided with a reversible pulse-actuated digital counter for generating, responsive to said unbalance signal output, said counterbalancing feedback, and with a binary counter receiving the pulse train from said electrical pulse source at a frequency of $2f_1$, successive flip-flops of said binary counter furnishing fractions of said pulse train at progressively decreasing frequency fractions, the first of which flip-flops of said counter delivers a pulse train of frequency $f_1$ passed concurrently to a manual power switch introducing the pulse input to said pulse-actuated digital counter and to said second pulse-actuated means generating said control effectuation signal applied to said apparatus operating on said process, thereby supplying the proportional component $K_1\Delta F$ of said control effectuation signal in accordance with said control algorithm, a first manual ganged switch establishing electrical circuit between preselected independent bit positions of said counter and plurality of AND gates, thereby furnishing one input to said AND, gates, means ganging said first manual ganged switch with said manual power switch in a manner maintaining the ratio of signal magnitudes switched from said first manual ganged switch and said manual power switch equal to unity, so that the preselected value of reset constant T is always a function of the setting of a second manual ganged switch exclusively, said second ganged switch having its contacts connected in individual circuit with single sides of said flip-flops of said binary counter, thereby furnishing the other input to said AND gates, and an OR gate in series electrical circuit between the outputs of said AND gates and said second pulse-actuated means generating said control effectuation signal applied to said apparatus operating on said process, thereby supplying the reset component $$K_1/T \int_0^t \Delta F dt$$

of said control effectuation signal in accordance with said control algorithm.

References Cited

UNITED STATES PATENTS

| | | | |
|---|---|---|---|
| 3,098,219 | 7/1963 | Voigt et al. | 235—153 |
| 3,194,950 | 7/1965 | Walls et al. | 235—150.5 |
| 3,201,572 | 8/1965 | Yetter | 235—151 |
| 3,232,157 | 2/1966 | McMath et al. | 235—151.1 |
| 3,317,717 | 5/1967 | Schumann | 235—151 |
| 3,348,031 | 10/1967 | Russell et al. | 235—150.5 |
| 3,382,352 | 5/1968 | Yetter | 235—151.1 |
| 3,409,251 | 11/1968 | Lawson et al. | 235—150.5 |

MALCOLM A. MORRISON, Primary Examiner

E. J. WISE, Assistant Examiner

U.S. Cl. X.R.

235—150.5